United States Patent
Kinderman et al.

(10) Patent No.: US 10,394,699 B1
(45) Date of Patent: Aug. 27, 2019

(54) METHOD AND SYSTEM FOR REUSING A REFINEMENT FILE IN COVERAGE GRADING

(71) Applicant: Cadence Design Systems, Inc., San Jose, CA (US)

(72) Inventors: Yael Kinderman, Givat Shmuel (IL); Oded Oren, Tel-Aviv (IL); Yaara Gradovitch, Givat Shmuel (IL)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/700,852

(22) Filed: Sep. 11, 2017

(51) Int. Cl.
*G06F 11/36* (2006.01)

(52) U.S. Cl.
CPC ................. *G06F 11/3676* (2013.01)

(58) Field of Classification Search
CPC ...... G06F 8/30; G06F 8/35–8/36; G06F 8/40; G06F 8/51; G06F 17/50–17/5095
See application file for complete search history.

(56) References Cited

U.S. PATENT DOCUMENTS

| | | | | |
|---|---|---|---|---|
| 5,673,387 A * | 9/1997 | Chen | ................... | G06F 11/3676 707/999.202 |
| 5,712,857 A * | 1/1998 | Whitman | ............ | G01R 31/3004 324/762.02 |
| 6,185,516 B1 * | 2/2001 | Hardin | ................... | G06F 17/504 703/14 |
| 6,536,036 B1 * | 3/2003 | Pavela | ................ | G06F 11/3676 707/999.104 |
| 7,272,752 B2 * | 9/2007 | Farchi | ................. | G06F 11/3676 714/37 |
| 7,355,514 B2 * | 4/2008 | Medve | ................ | G07C 9/00111 340/539.13 |
| 7,441,216 B1 * | 10/2008 | Shacham | .............. | G06F 17/504 716/106 |

(Continued)

OTHER PUBLICATIONS

Strommer et al., A Framework for Model Transformation By-Example: Concepts and Tool Support, published by Springer-Verlag Berlin Heidelberg 2008, pp. 372-391, [Retrieved online on Jun. 19, 2018 <https://link.springer.com/content/pdf/10.1007%2F978-3-540-69824-1_21.pdf>] (Year: 2008).*

(Continued)

*Primary Examiner* — Thuy Dao
*Assistant Examiner* — Zheng Wei
(74) *Attorney, Agent, or Firm* — Pearl Cohen Zedek Latzer Baratz LLP (57) ABSTRACT

A method for reuse of a refinement file in coverage grading, may include obtaining a refinement file that includes a listing of coverage entities of a first coverage model, for exclusion from a calculation of coverage grading of the first coverage model; obtaining mapping information to map a source path of each of the modules or instances of a module, that include one or more of said coverage entities in the first coverage model to a target path of each of said modules or instances of a module in a second coverage model; and using a processor, based on the refinement file and the mapping information, translating a source path of each of said coverage entities listed in the refinement file to a target path of a coverage entity of the coverage entities in the second coverage model.

12 Claims, 7 Drawing Sheets

(56) References Cited

U.S. PATENT DOCUMENTS

| | | | | |
|---|---|---|---|---|
| 7,448,005 | B2* | 11/2008 | Baumgartner | G06F 17/504 703/2 |
| 7,552,043 | B2* | 6/2009 | Bobok | G06F 17/5022 703/13 |
| 7,676,552 | B2* | 3/2010 | Eilam | G06F 9/5061 379/242 |
| 7,779,398 | B2* | 8/2010 | Tjong | G06F 8/51 717/141 |
| 8,086,560 | B2* | 12/2011 | Hernandez-Sherrington | G06F 17/218 707/601 |
| 8,250,008 | B1* | 8/2012 | Cao | G06Q 30/02 370/392 |
| 8,413,088 | B1* | 4/2013 | Armbruster | G06F 17/504 716/100 |
| 8,826,202 | B1* | 9/2014 | Goel | G06F 17/504 716/106 |
| 9,317,405 | B2* | 4/2016 | Yoshida | G06F 11/3684 |
| 9,477,580 | B2* | 10/2016 | Chan | G06F 11/3676 |
| 9,576,258 | B1* | 2/2017 | Salle | G06Q 10/0631 |
| 9,824,175 | B1* | 11/2017 | Gupta | G06F 17/5081 |
| 9,880,922 | B1* | 1/2018 | Koh | G06F 9/44505 |
| 9,891,281 | B1* | 2/2018 | Kinderman | G01R 31/3177 |
| 9,927,232 | B2* | 3/2018 | Bienkowski | G01B 21/04 |
| 9,946,634 | B2* | 4/2018 | Chan | G06F 11/3676 |
| 2003/0046613 | A1* | 3/2003 | Farchi | G06F 11/3676 714/38.1 |
| 2005/0256665 | A1* | 11/2005 | Hartmann | G06F 11/3684 702/121 |
| 2006/0129959 | A1* | 6/2006 | Mang | G06F 17/504 716/103 |
| 2006/0224425 | A1* | 10/2006 | Homann | G06Q 10/0637 705/7.36 |
| 2006/0236156 | A1* | 10/2006 | Cunningham | G06F 11/3676 714/38.1 |
| 2007/0006196 | A1* | 1/2007 | Tjong | G06F 8/51 717/151 |
| 2007/0058570 | A1* | 3/2007 | Singh | H04L 41/0866 370/254 |
| 2007/0061121 | A1* | 3/2007 | Bobok | G06F 17/5022 703/13 |
| 2007/0174799 | A1* | 7/2007 | Baumgartner | G06F 17/504 716/103 |
| 2008/0046864 | A1* | 2/2008 | Bai | G06F 8/35 717/105 |
| 2008/0189094 | A1* | 8/2008 | Adir | G01R 31/318371 703/14 |
| 2008/0195368 | A1* | 8/2008 | Bobok | G06F 17/5022 703/16 |
| 2009/0113437 | A1* | 4/2009 | Sedukhin | G06F 8/10 718/103 |
| 2009/0150854 | A1* | 6/2009 | Elaasar | G06F 8/10 717/104 |
| 2009/0222751 | A1* | 9/2009 | Gibson | G06F 8/71 715/771 |
| 2009/0300559 | A1* | 12/2009 | Baumgartner | G06F 17/5063 716/136 |
| 2010/0064275 | A1* | 3/2010 | Akkiraju | G06F 8/34 717/104 |
| 2010/0077386 | A1* | 3/2010 | Akkiraju | G06F 8/36 717/136 |
| 2010/0192114 | A1* | 7/2010 | Moon | G06F 17/504 716/106 |
| 2011/0196659 | A1* | 8/2011 | Salle | G06F 17/50 703/6 |
| 2011/0209126 | A1* | 8/2011 | Fehnker | G06F 11/3608 717/131 |
| 2015/0220424 | A1* | 8/2015 | Yoshida | G06F 11/3684 714/38.1 |

OTHER PUBLICATIONS

Cuadrado et al., Modularization of model transformations through a phasing mechanism, published by Springer, pp. 325-345, [Retrieved online on Jun. 19, 2018 <https://link.springer.com/article/10.1007/s10270-008-0093-0>] (Year: 2008).*

Ciccozzi et al., Automating Test Cases Generation: From xtUML System Models to QML Test Models, published by MOMPES '10, Sep. 20, 2010, Antwerp, Belgium, pp. 9-16 (Year: 2010).*

Reuys et al., Model-Based System Testing of Software Product Families, published by Springer-Verlag Berlin Heidelberg 2005, pp. 519-534 (Year: 2005).*

* cited by examiner

METHOD AND SYSTEM FOR REUSING A REFINEMENT FILE IN COVERAGE GRADING

FIELD OF THE INVENTION

The present invention relates to verification of coverage models, such as electronic designs. More specifically the present invention relates to method and system for reusing a refinement file in coverage grading.

BACKGROUND OF THE INVENTION

Verification is a tedious task that may occupy a considerable amount of time of programmers. Specifically, a lot of time may be invested in locating faults (typically referred to as "bugs") in the program. Automatic fault localization techniques were introduced that are aimed at addressing this problem. For example, automatic fault localization may involve the use of coverage information.

When testing a code, the extent to which that code was actually tested—typically referred to as "coverage"—may be measured.

There are various kinds of coverage metrics, like code coverage, functional coverage, etc.

In the process of verification of an electronic design, when grading coverage for that design, a refinement file may be generated that includes entities in the design which a user may wish to exclude from the calculation of coverage grading.

To-date, when a verified electronic design is incorporated in a larger design, a new refinement file may be needed for the verification process of the larger design, which may typically be produced typically be manually editing the refinement file that was associated with the previously verified design.

SUMMARY OF THE INVENTION

There is thus provided, in accordance with some embodiments of the present invention, a method for reuse of a refinement file in coverage grading. The method includes obtaining a refinement file that includes a listing of one or a plurality of coverage entities of a first coverage model, for exclusion from a calculation of coverage grading of the first coverage model. The method also includes obtaining mapping information to map a source path of each of one or a plurality of modules or instances of a module, that include one or more of said one or a plurality of coverage entities in the first coverage model to a target path of each of said one or a plurality of modules or instances of a module in a second coverage model. The method further includes using a processor, based on the refinement file and the mapping information, translating a source path of each of said one or a plurality of coverage entities listed in the refinement file to a target path of a coverage entity of said one or a plurality of coverage entities in the second coverage model, so as to exclude said one or a plurality of coverage entities from a calculation of coverage grading of the second coverage model.

In some embodiments of the invention obtaining of the mapping information includes obtaining a selection of an instance of a module of said one or a plurality of modules or a module, and wherein the method further comprises, using the processor, automatically identifying all instances of the module.

In some embodiments, the translating includes translating the source path of each of said one or a plurality of coverage entities listed in the refinement file to the target path of said one or a plurality of coverage entities in all instances of the module in the second coverage model, so as to exclude said one or a plurality of coverage entities in from a calculation of coverage grading of the second coverage model.

In some embodiments, the method further includes obtaining new mapping information to map the target path of each of said one or a plurality of modules or instances of a module in the second coverage model to a new target path of each of said one or a plurality of modules or instances of a module in a third coverage model, and using a processor, based on the refinement file, the mapping information, and the new mapping information, translating the source path of each of said one or a plurality of coverage entities listed in the refinement file to a new target path of a coverage entity of said one or a plurality of coverage entities in the third coverage model, so as to exclude said one or a plurality of coverage entities from a calculation of coverage grading of the third coverage model.

In some embodiments of the invention the refinement file includes a condition associated with a coverage entity of said one or a plurality of coverage entities of the refinement file, the method further comprising excluding that coverage entity in the calculation only if the condition associated with that coverage entity is met.

In some embodiments of the present invention, the method further includes receiving one or more conditions and associating said one or more conditions with more coverage entities of said one or a plurality of coverage entities of the refinement file.

In some embodiments, the method further includes using the refinement file and the mapping information, generating a new refinement file wherein said one or a plurality of coverage entities include the translated target path.

In some embodiments of the present invention, there is provided a system for reuse of a refinement file in coverage grading includes a memory and a processor configured to obtain a refinement file that includes a listing of one or a plurality of coverage entities of a first coverage model, for exclusion from a calculation of coverage grading of the first coverage model, obtain mapping information to map a source path of each of one or a plurality of modules or instances of a module, that include one or more of said one or a plurality of coverage entities in the first coverage model to a target path of each of said one or a plurality of modules or instances of a module in a second coverage model, and using a processor, based on the refinement file and the mapping information, translate a source path of each of said one or a plurality of coverage entities listed in the refinement file to a target path of a coverage entity of said one or a plurality of coverage entities in the second coverage model, so as to exclude said one or a plurality of coverage entities from a calculation of coverage grading of the second coverage model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as is apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

When testing a design, the measuring the extent of coverage of that design during execution runs may prove a valuable information. A "design" may refer to an electronic design, which may be implemented in software (e.g., as a model) which is used in testing and verification of that design.

Hereinafter some embodiments of the invention are described with reference is made to a "design under test", by way of example, but it should be understood that some embodiments of the present invention may be implemented on any model (hereinafter—coverage model) being tested the coverage of which is to be graded.

There are various kinds of coverage metrics, such as code coverage, that measures the percentage of code that was executed during execution runs, and functional coverage, measuring the percentage of functionalities pertaining to that code that were executed during execution runs.

Code coverage is a metric that measures the extent (typically by percentage) at which the code lines were executed in the implementation of a design under test (DUT). There are a number of other metrics associated with code coverage that electronic design automation (EDA) tools can measure, such as, for example, whether each code line has toggled to their true or false states, etc.

Functional coverage is a metric that measures the coverage of functionalities of the DUT.

EDA tools (e.g., tools employing a hardware description language—HDL, such a, for example, Verilog) may generate parts of or a complete coverage model of a DUT. In some embodiments of the invention parts of or complete coverage model of the DUT may be alternatively or additionally provided, for example, by a user (e.g., a verification tester, debugging expert, another user etc.—hereinafter generally referred to as a "user"). A functional coverage model, or functional coverage entities of a code coverage model, may typically be provided by a user.

Figure 1:
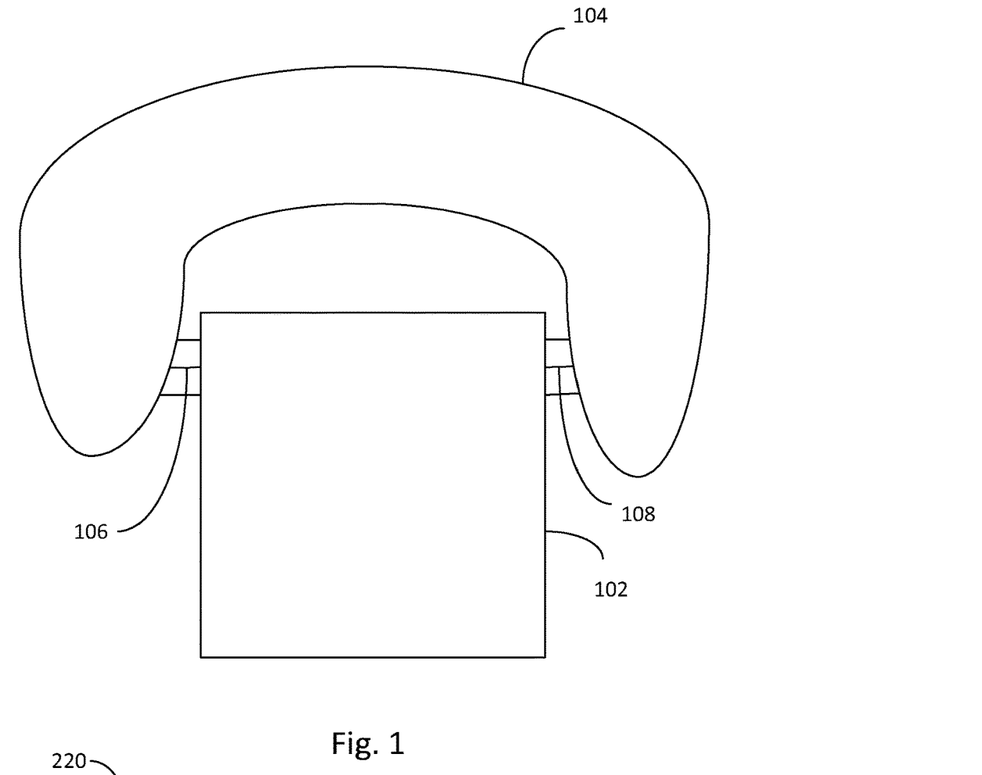
FIG. 1 illustrates a scheme of a design under test—DUT—with a test-bench—a verification environment that is designed to test the DUT, according to some embodiments of the present invention.

FIG. 1 illustrates a scheme of a DUT 102 with a test-bench 104—a verification environment that is designed to test the DUT, according to some embodiments of the present invention. Test bench 104 may typically inject inputs into DUT 102 via inputs 106 and may collect data output from DUT 102 via outputs 108. In some embodiments of the present invention, test-bench 104 may be designed to generate the inputs to be input into DUT 102 and to analyze the outputs received from the DUT.

Figure 2:
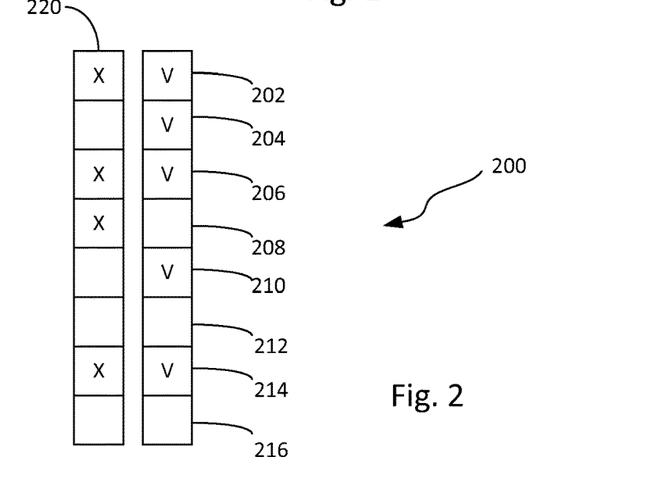
FIG. 2 illustrates a coverage checklist, according to some embodiments of the present invention.

FIG. 2 illustrates a coverage checklist, according to some embodiments of the present invention. Typically, a code coverage checklist of code coverage entities of interest may be automatically generated by an EDA tool, e.g., a list of code coverage entities 202, 204, 206, 208, and 210. In addition, a user may manually add functional coverage entities of interest, e.g., 212, 214 and 216, which the user wants to be monitored (typically as a code pertaining to the test-bench). The code coverage entities and functional coverage entities may be organized into a checklist 200 and presented to the user, for example, via a graphical user interface (GUI) which may be displayed on a display device. When testing the DUT a plurality of tests is run on the DUT. As testing of the DUT progresses more and more coverage entities are covered (that is—a specific test execution causes specific coverage entities to be covered by the execution flow during one or a plurality of tests).

As more and more test are executed on the DUT, more coverage entities on checklist 200 are covered by the tests and the percentage of the overall coverage may be calculated A user (the same user who is involved in generating the checklist or any other user—hereinafter referred to as the "user") may decide that one or some (or all) coverage entities that are included in checklist 200 (either coverage entities that were automatically included or coverage entities that were added manually) are of no or little interest or have been covered up to a certain level, and should not be counted in the coverage score and therefore should be removed from checklist 200. This may be accomplished by performing refinement.

When performing refinement coverage entities are excluded from the coverage checklist 200. For example, a user may exclude coverage entities, such as, for example, coverage entities 202, 206, 208, and 214, by selecting these coverage entities, e.g., using a GUI 220 on which coverage entities for exclusion may be marked by the user (for example by "X"), or may be selected in a batch operation. A refinement file may thus be generated that lists exclusions of coverage entities from checklist 200. When activated, the refinement file may cause the coverage entities included that file to be excluded from coverage grading, no longer taking them into account when calculating the coverage grade.

During a typical verification process, design hierarchies may change. When such changes occurs a refinement file that was produced for that design may no longer be valid. A module, or an instance of a module may have an associated refinement file made for use in coverage grading of that module or instance. The refinement file may include path names of coverage entities that may change when the design hierarchies are changed. Typically these path names would not be completely changed, as the internal hierarchy of elements within a module may be still maintained, but the prefix of these path names may have changed.

Figure 3A:
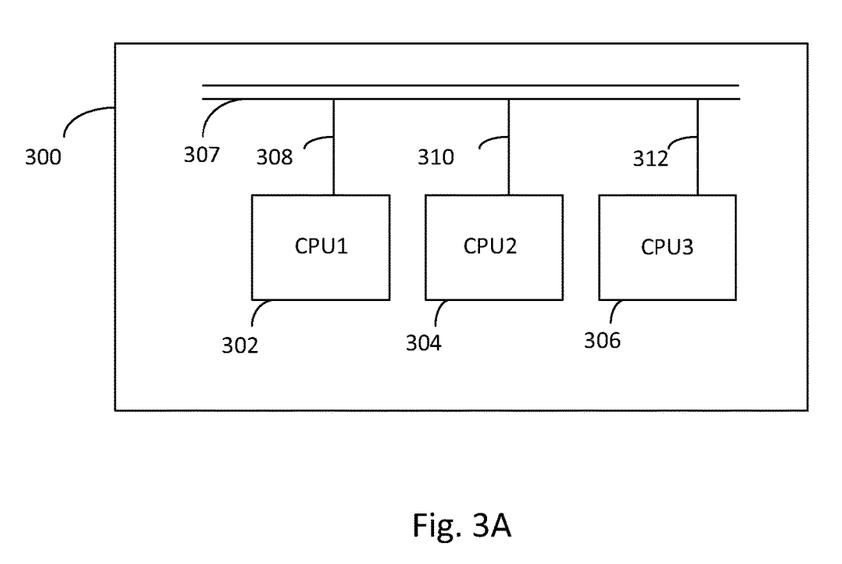
FIG. 3A schematically illustrates a block to be tested, comprising four devices, according to some embodiments of the present invention.

FIG. 3A schematically illustrates a block 300 to be tested, comprising four devices, according to some embodiments of the invention.

block 300 may include several devices, e.g., CPU1 302, CPU2 304, CPU3 306. Device 302, 304 and 306 may be linked to a bus 307 via links 308, 310 and 312, respectively.

At some stage in the verification process of each of the devices, there may have been a refinement file that was specifically made for each of the devices (e.g., manually written, automatically generated etc.). According to some embodiments of the invention, it is asserted that it may be advantageous to keep that refinement file for later use and use it when testing system 300, for the considerations which led to the exclusion of specific coverage entities of a device during its earlier verification stage, may still hold for the testing of the system which that device is part of. Keeping the refinement file for that device and using again when testing the system in which that device is part of may save time and increase efficiency and productivity of the verification process.

Figure 3B:
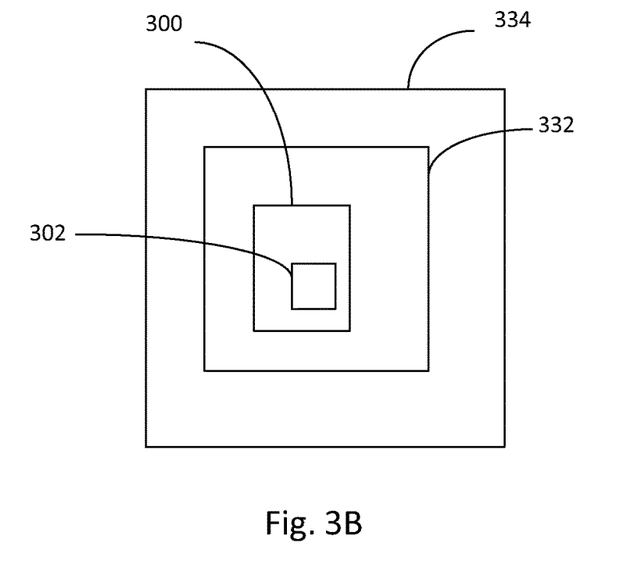
FIG. 3B schematically illustrates a system with a block (the block shown in FIG. 3A), incorporated within that system, according to some embodiments of the invention.

FIG. 3B schematically illustrates a system 334 that has block 300 (e.g., the block 300 shown in FIG. 3A), incorporated in that system, according to some embodiments of the invention.

System 334 may include a sub-system (hereinafter referred to as "block"), that may be named "sys" 332. Sys 332 may include a block named "x" 300 (e.g. block 300 of FIG. 3A), which, in turn, includes a device (module) e.g., a CPU 302 (e.g., CPU 302 of the block 300 shown in FIG. 3A, named "cp").

Working at the block level, a user may wish to exclude some coverage entities—e.g., a module, an instance of a module, a coverage entity (e.g., a block, a coverage bin, toggle, etc.) within a module or within an instance of the module—from and the calculation of grading coverage, and save those exclusions into a refinement file. These exclusions saved into the refinement file are typically based on the pathnames of the instances of these coverage entities in the coverage model.

A refinement file may typically be produced for device 302 when it is tested. Such refinement file may include an entry for excluding "cp" (a coverage entity) that may indicate the exclusion of "cp" by designating a hierarchial pathname (notation), such as "sys/x/cp", to distinctly refer to coverage point "cp" that is under "x", which itself is under "sys" Similarly, to distinctly refer to an entity "y" under "x" in that same device, the notation for that entity would look like: "sys/x/y".

It is possible, and even reasonable, to assume that when testing a system (e.g., system 334 in FIG. 3B) which includes a previously tested block (e.g., block 300, now part of system 334), the exclusions of coverage entities in that block, that were previously excluded from the coverage score (and included, for that aim, in the refinement file that was produced for the testing of that block), from the coverage grading of the entire system may still be desired. A tester may wish to have the same exclusions of coverage entities that were included in the refinement file of the block when it was separately tested and coverage rated, when testing and grading coverage for the system that includes that device. Similarly, when a coverage model (e.g., design) includes a module or an instance of a module which is moved to a different node in the hierarchy within that coverage module, the refinement file that was previously produced for that module or instance may still be relevant for coverage grading of the modified coverage model, in its new form.

However, when making such changes the pathnames to the formerly excluded entities that are included in the original refinement file render the original refinement file invalid.

The pathname of coverage entity "cp" in the greater system (e.g., block 300) may probably look different, such as, for example, "mysys/cpu/x/cp" (and not "sys/x/cp" as it was before).

While the name of a module within the modified coverage model may be changed as a result of the modification of the coverage model, typically the elements within that module may retain their original names, so that resue of the original refinement file may be very appealing, for otherwise a lot of work may be needed to generate a new refinement file for the modified coverage model, when in fact that new refinement file may point to the same coverage elements where only the prefix of their pathnames has changed.

There may be cases when there are a number of instances of a module present in a coverage model. In the process of coverage grading a user may wish to apply exclusions of coverage entities from the calculation of coverage grading only on one or some of the instances of that module.

A refinement file that was originally made for use to exclude coverage of a first coverage model may include many coverage entities for exclusion from the coverage grading calculation. In fact in many cases the number of excluded coverage entities in a refinement file may be in the order of a few or many thousands, sometimes in the order of millions, if not more. According to some embodiments of the present invention, reuse of the refinement file that was produced for the first coverage model is made possible instead of discarding it and producing a new refinement file from scratch refinement file when calculating coverage grading of a second coverage model which includes a module or an instance of a module of the first coverage model, or when the hierarchies in a coverage model are changed.

To-date, when a block is incorporated in a greater system, or if a coverage model is modified, for example, by changing the position of a block within the model (e.g., changing the hierarchy of a block in a design), pathnames of coverage entities of the coverage model may change, causing a refinement file that was originally provided for that coverage model to be non-reusable, because the pathnames of coverage entities in that refinement file are no longer valid, in the modified coverage model.

This may force the user to manually edit a substantial number of coverage entities for exclusion to amend their prefixes so as to comply with the new design.

Figure 4:
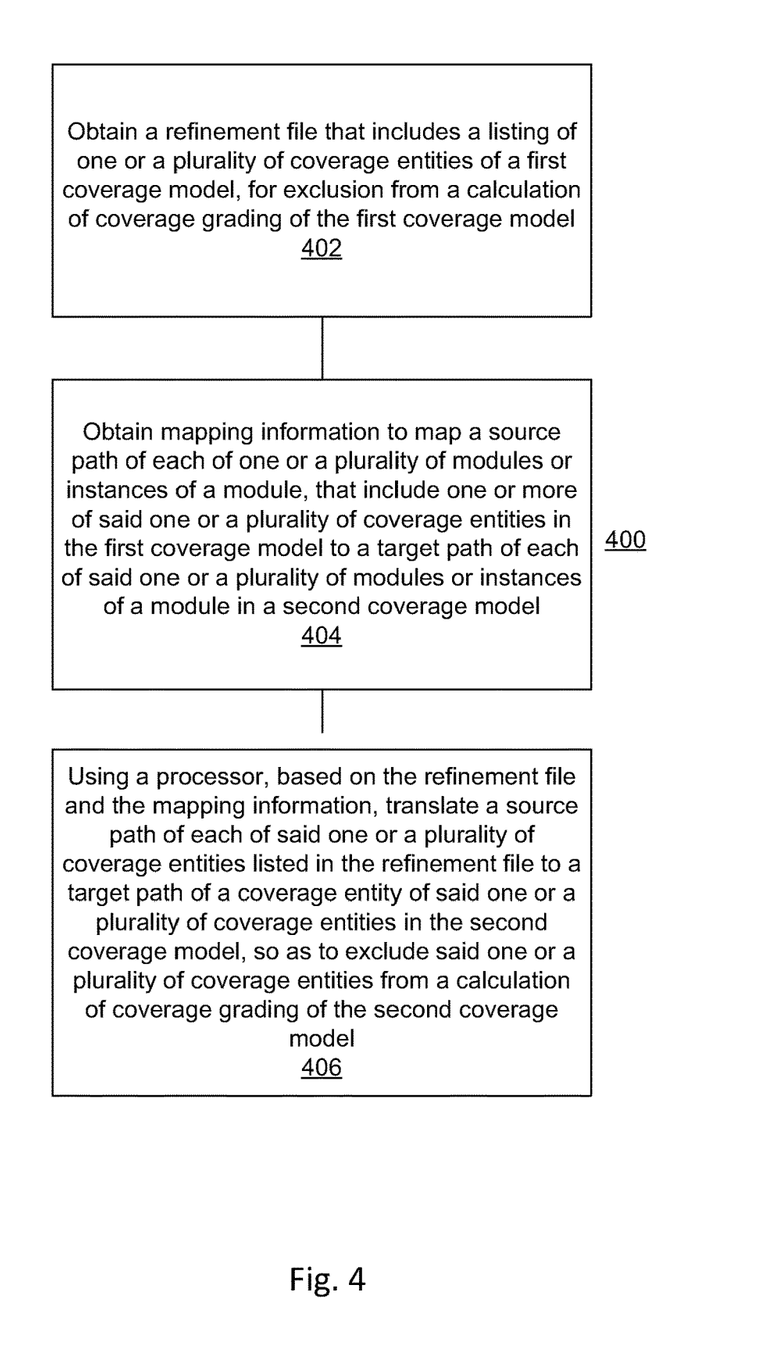
FIG. 4 illustrates a method for facilitating reuse of refinement a file, according to some embodiments of the present invention.

FIG. 4 illustrates a method 400 for reuse of refinement files in coverage grading of, according to some embodiments of the invention. Method 400 may include obtaining (402) a refinement file that includes a listing of one or a plurality of coverage entities of a first coverage model, for exclusion from a calculation of coverage grading of the first coverage model. Method 400 may also include obtaining (404) mapping information to map a source path of each of one or a plurality of modules or instances of a module, that include one or more of said one or a plurality of coverage entities in the first coverage model to a target path of each of said one or a plurality of modules or instances of a module in a second coverage model. Method 400 may further include using a processor, based on the refinement file and the mapping information, translating (406) a source path of each of said one or a plurality of coverage entities listed in the refinement file to a target path of a coverage entity of said one or a plurality of coverage entities in the second coverage model, so as to exclude said one or a plurality of coverage entities from a calculation of coverage grading of the second coverage model.

Facilitating the reuse of a refinement file may result in a dramatic time saving, as instead of preparing a new refinement file for the same module—now in a new design—or manually editing the old refinement file a, EDA tool can automatically adjust the old refinement file to the new situation. Some embodiments of the present invention provide a simple, automatic way, of reusing the original refinement file, by automatically translating source pathnames of coverage entities in that refinement file to target pathnames, and use the translated pathnames for coverage grading of the new design.

Obtaining of the mapping information may include, for example, obtaining a selection of a module or an instance of a module. For example, the user may be asked (e.g., prompted) to select a module or an instance of a module in the design.

In some embodiments of the invention using the processor, all instances of a selected module are automatically identified, so the user may select just one instance of a module in the design and all instances of that module are automatically mapped so that the coverage entities in all of these instances of the selected module may also be excluded from the calculation of the coverage grading of the design (hence included in the coverage entities of the refinement file).

The mapping information may be provided by a user, via an input device, e.g., by entering that information using a keyboard, using a GUI, etc. The mapping information may be saved in a file ("mapping file"). This allows reuse of the refinement file by obtaining the refinement file and the mapping file and using both in the process of calculating coverage grading of the modified design. The mapping file may include a set of source paths of coverage entities in the source model (e.g., a module level model) and the target paths of the related coverage entities in a target model (e.g., a system level model).

In some embodiments of the invention, the EDA tool may generate a list of all of the instances of the module in the system and cause the list to be displayed on a display device. Such list may be useful in allowing the user to review the instances whose coverage entities are going to be excluded from the calculation of coverage grading, In some embodiments the translation includes adding a prefix to the source pathname or amending an existing prefix of the source pathname.

The translation of the source path names of the coverage entities to the target path names of the coverage entities in the modified design may be carried out on the fly. This means that the translation is carried out without having to first save the translated pathnames, or to generate a new refinement file with the translated coverage entities.

In some other embodiments of the invention the original refinement file and the mapping file are incorporated into a new refinement file. The new refinement file may be saved for future use.

Figure 5A:
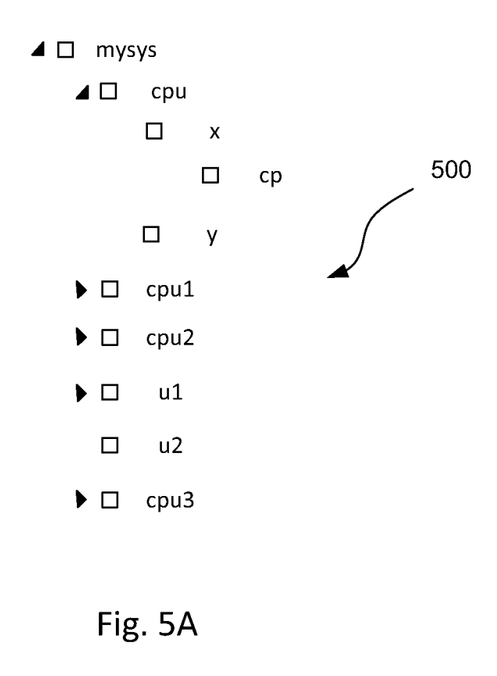
FIG. 5A illustrates a hierarchy graph of a design according to some embodiments of the present invention.

A module may appear in a design in one instance or in a plurality of instances. FIG. 5A illustrates a hierarchy graph 500 of a coverage model according to some embodiments of the present invention. The coverage model in this figure is named "mysys" that includes a plurality of instances of a module named "cpu", "cpu1", "cpu2", "u1", "u2" and "cpu3", according to some embodiments of the invention. The instances "cpu", "cpu1", "cpu2" and "cpu3" may all be of the same module type (e.g., cpu type), which may essentially mean that they all have the same design and include the same coverage entities. Thus, the user may be allowed to select one of the instances of the module, and the EDA tool may then automatically scan the hierarchy tree (e.g., the hierarchy tree 500 of FIG. 4) of the coverage model, reviewing each node of the tree, and identify all instances of the same module (of the same type), despite them having different pathnames than the pathname of the user-selected instance, by determining them to be of the same type as the user-indicated instance.

According to some embodiments of the invention, the automated identification process may produce pairs of source-target pathname associations. These pairs include a source path, which is the path of an instance of a module in the initial coverage model, and a target path which is the path of that instance of the module in the modified coverage model.

In some embodiments, the pairs of source-target pathnames associations are used to automatically generate a new refinement file for the modified model linking the old refinement file of the initial model (e.g., of the selected instance of the module) and the mapping of other identified instances of that module in the modified model.

Figure 5B:
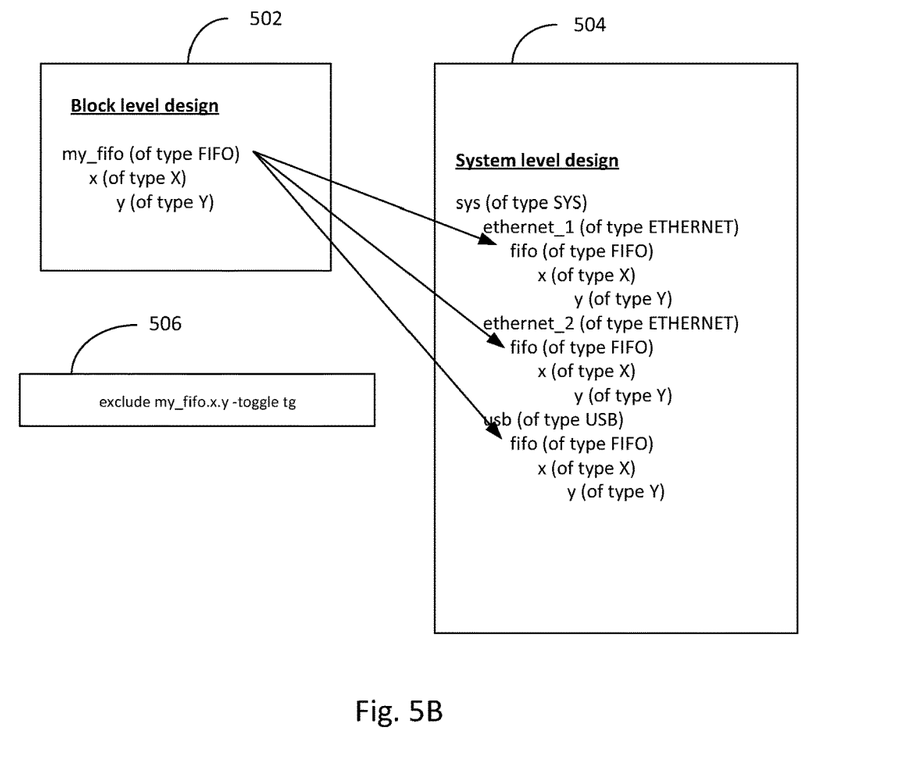
FIG. 5B illustrates mapping of a module of a block to instances of that module in a system that includes that block, according to some embodiments of the invention.

FIG. 5B illustrates mapping of an instance of a block to instances of that block in a system that includes that block, according to some embodiments of the invention. The design of block 502 may include instance called "my_fifo" which is of a FIFO module. The design of system 504, may include several instances of FIFO module, (in this example, three instances). The original refinement file 506 that was produced for "my_fifo" may include an entry like "exclude my_fifo.x.y-toggle tg". Thus, for example, in order to map all exclusion rules under 'my_fifo' in the block level (within the refinement file of the block, in this case) to all 'FIFO instances in the system level the following mapping:
include refinement 506,
Using mapping:
"-source my_fifo-target sys.ethernet_1.fifo, sys.ethernet_2.fifo,my_fifo fifo,sys.usb.fifo"
Specifying each relevant instance of FIFO instance in system 504.
Or alternatively use:
include refinement 506,
Using mapping:
  "-source my_fifo-targettype FIFO,
Where the EDA tool may find all relevant instances of FIFO and apply this mapping (e.g., as if the above three mapping rules were specified).

Figure 5C:
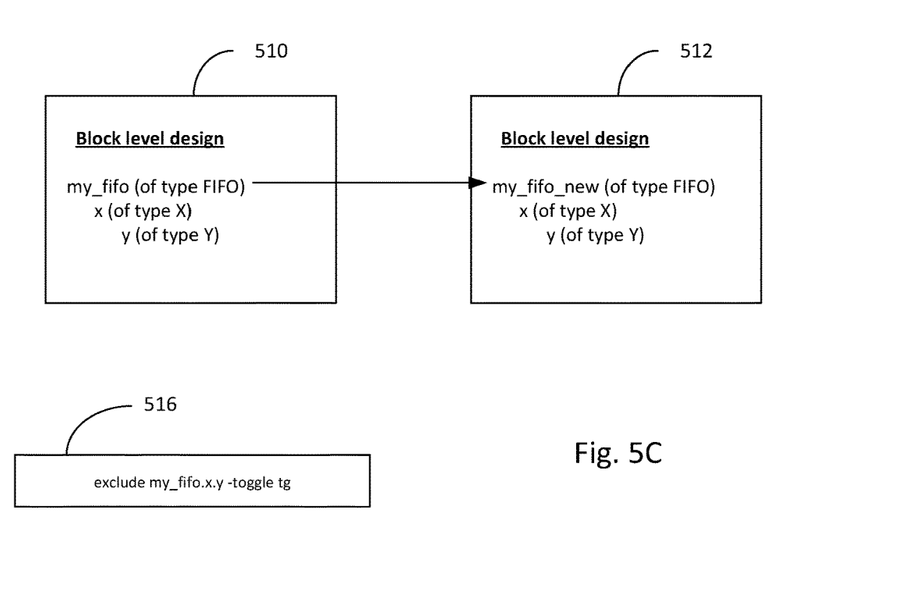
FIG. 5C illustrates mapping of a module of a design to an instance of that module in a modified design according to some embodiments of the invention.

FIG. 5C illustrates mapping of an instance of a design 510 to an instance of that instance in a modified design 512 according to some embodiments of the invention.

For example, in order to map all exclusion rules under 'my_fifo' in design 510 to all 'my_fifo_new' instance in the new design 512 the following mapping may be used:
include refinement 516
Using mapping: "-source my_fifo-target my_fifo_new"

The automated identification of all same-type instances and automated translation of the path names of the coverage entities in a source instance to pathnames of these coverage entities on all the corresponding instances in the target design facilitates the use of the original refinement file in coverage grading of the new design, where all same-type instances of the indicated instance in the design are included in the calculation of coverage grading using the original refinement file.

According to some embodiments of the invention, the new (or modified) design itself may be included in yet another further modified design.

Figure 6A:
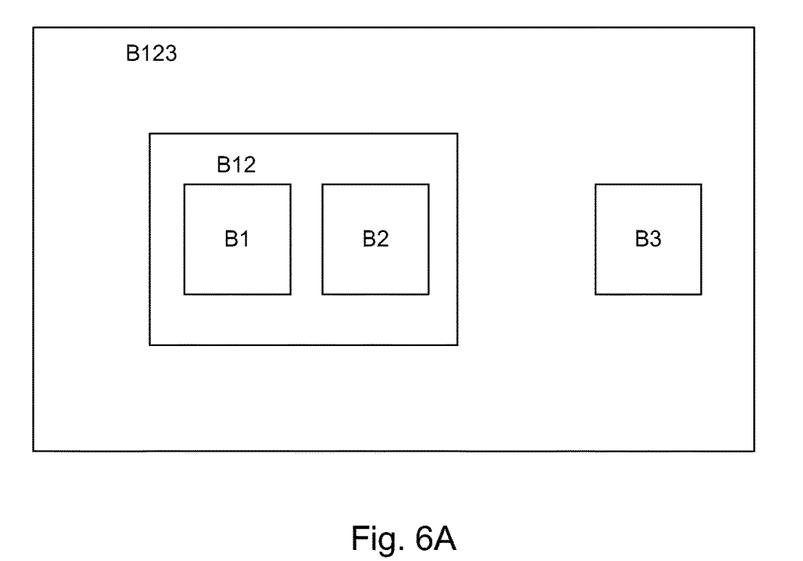
FIG. 6A illustrates a design made up of a plurality of modules at various hierarchy level.

FIG. 6A illustrates a design with modules in various hierarchy levels, according to some embodiments of the invention. design B123 is shown, having two sub-designs of the same hierarchy level—B12 and B3. B12 has two sub-designs—B1 and B2. B1, B2 and B3 appear to be blocks of design B123.

Given that blocks B1, B2 and B3 were each subjected to a verification process, in which a refinement file was generated for each of these modules, the next verification stages may utilize the refinement files of these modules, in accordance with some embodiments of the invention.

Figure 6B:
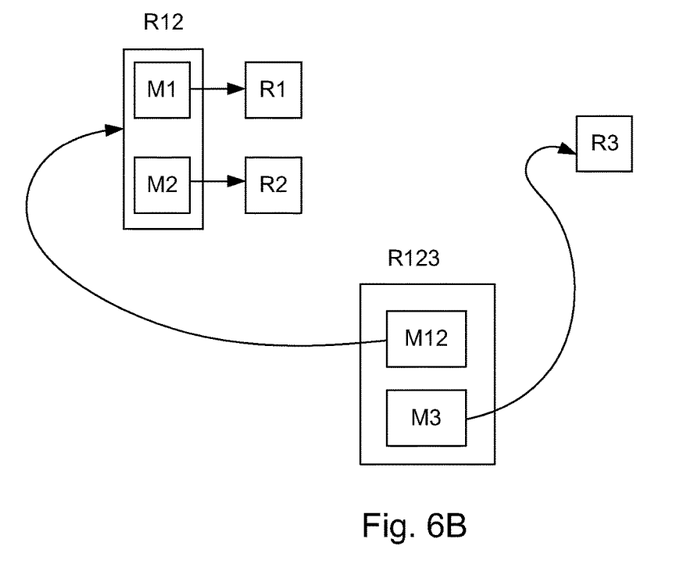
FIG. 6B illustrates the reuse of original refinement files associated with modules of the design shown in FIG. 6A, for coverage grading performed on the whole system, in accordance with some embodiments of the invention.

FIG. 6B illustrates the use of the original refinement files of the basic modules for coverage grading performed on the greater design (B123), in accordance with some embodiments of the invention. R1 is the original refinement file used for coverage grading in the verification process of B1, R2 is the original refinement file used for coverage grading in the verification process of B2, and R3 is the original refinement file used for coverage grading in the verification process of B3. M1 is the mapping information for R1, and M2 is the mapping information for B2, which are used to include and map the original refinement files (R1 and R2) for the newly formed refinement file R12 for B12. M12 is the mapping information for B12, and M3 is the mapping information for R3. M12 and M3 are used for generating the refinement file R123 for B123. Thus, it may be possible, according to some embodiments of the invention, to utilize the refinement files of the basic—lowest level—modules of the system, in calculating the coverage grading of the greater design. This method may be performed automatically involving little involvement of the user.

Thus, according to some embodiments of the present invention, a method for facilitating reuse of a refinement file in coverage grading also includes obtaining new mapping information to map the target path of each of the modules or instances of the module in the second coverage model to a new target path of each of the modules or instances of the module in a third coverage model. Then, using a processor, based on the refinement file, the mapping information, and the new mapping information the method further may include translating the source path of each of the coverage entities listed in the refinement file to a new target path of a coverage entity of the coverage entities in the third coverage model, so as to exclude these coverage entities from a calculation of coverage grading of the third coverage model.

As verification is a lengthy process it may be desired to facilitate selective exclusion of coverage entities in a refinement file. For example, while one user may wish to exclude certain coverage entities form the calculation of coverage grading, another user may want to exclude other coverage entities while including the previously excluded coverage entities in that calculation. Therefore, according to some embodiments of the invention, a user may apply conditional refinement, by associating conditions to one or more selected coverage items such as a coverage entity or entities, a module (which affects all instances of that module) or modules, and one or more instances of a module, which only if met, result in the exclusion of the coverage entities corresponding to the selected items from the calculation of coverage grading. In some embodiments, the EDA tool may allow the user to enter one or a plurality of conditions relating to one or a plurality of specific coverage items, so as to allow selective exclusion of coverage entities. For example, the user may input a condition related to a certain module (e.g., design B12), that only if met would result in the exclusion of the coverage entities of a corresponding refinement file for that module when grading coverage for the design that includes that module (e.g., design B123).

The mapping file may be reused when performing a conditional coverage grading, that is performing the coverage grading calculation only when a predetermined condition is met. A refinement or map file may be automatically generated, importing other lower level refinement and/or map files. Defining a condition allows a user the freedom to disregard one or a plurality of refinement files or map files.

Figure 7:
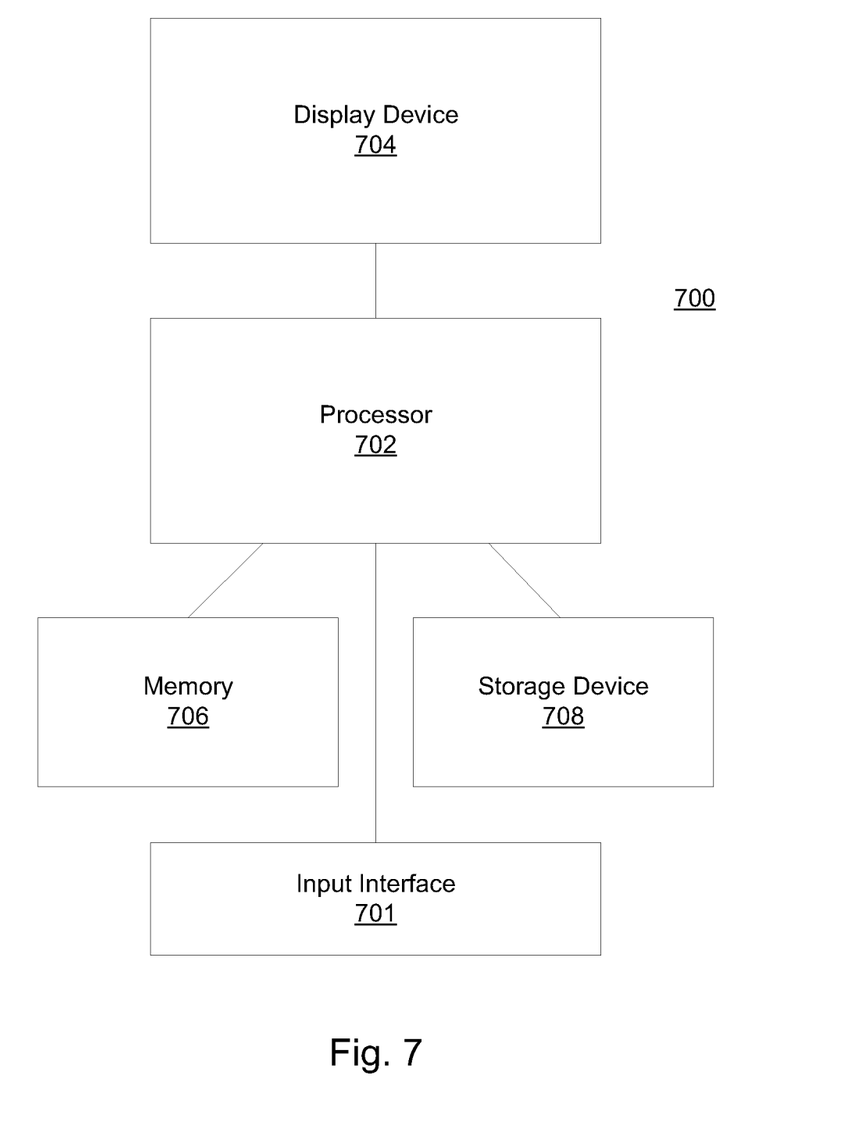
FIG. 7 illustrates a system for facilitating reuse of a refinement file, according to some embodiments of the invention.

FIG. 7 illustrates a system for reusing a refinement file in coverage grading, according to some embodiments of the invention.

System 700 may include a processing unit 720 (e.g. one or a plurality of processors, on a single machine or distributed on a plurality of machines) for executing a method according to some embodiments of the present invention. Processing unit 720 may be linked with memory 760 on which a program implementing a method according to some embodiments of the present invention and corresponding data may be loaded and run from, and storage device 780, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 740 (e.g. display device such as CRT, LCD, LED etc.) on which one or a plurality user interfaces associated with a program implementing a method according to some embodiments and corresponding data may be presented. System 700 may also include input device 710, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and be executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for reuse of a refinement file in coverage grading, the method comprising:
   obtaining a first coverage model for testing of a first design, the first coverage model including a plurality of coverage entities, a calculation of coverage grading of testing of the first design using the first coverage model including a percentage of the plurality of coverage entities that are covered during the testing;
   obtaining a refinement file that includes a listing of one or a plurality of the coverage entities to be excluded when calculating the coverage grading of the first coverage model;
   obtaining mapping information to map a source path of each of one or a plurality of modules or instances of a module of the first coverage model, said each of one or a plurality of modules or instances of a module including one or more of said one or a plurality of coverage entities, to a target path of said each of one or a plurality of modules or instances of a module in a second coverage model for testing a new design that includes said one or a plurality of modules or instances of a module, wherein the obtaining of the mapping information comprises obtaining a selection of an instance of a module of said one or a plurality of modules or instances of a module, and wherein the method further comprises, using the processor, automatically identifying all instances of the module in the second coverage model;
   using a processor, based on the mapping information, translating a source path name of each of said one or a plurality of the coverage entities listed in the refinement file to a target path name of a coverage entity of said one or a plurality of the coverage entities in a new refinement file for the second coverage model, so as to exclude said one or a plurality of the coverage entities from a calculation of coverage grading during testing of the new design using the second coverage model; and
   using the new refinement file during testing of the new design using the second coverage model.

2. The method of claim 1, further comprising
   obtaining new mapping information to map the target path of said each of one or a plurality of modules or instances of a module in the second coverage model to a new target path of said each of one or a plurality of modules or instances of a module in a third coverage model; and
   using a processor, based on the refinement file, the mapping information, and the new mapping information translating the source path name of each of said one or a plurality of the coverage entities listed in the refinement file to a new target path name of a coverage entity of said one or a plurality of the coverage entities in the third coverage model, so as to exclude said one or a plurality of the coverage entities from a calculation of coverage grading of the third coverage model.

3. The method of claim 1, wherein the refinement file includes a condition associated with a coverage entity of said one or a plurality of the coverage entities of the refinement file, the method further comprising excluding that coverage entity in the calculation only if the condition associated with that coverage entity is met.

4. The method of claim 1, further comprising receiving one or more conditions and associating said one or more conditions with more coverage entities of said one or a plurality of the coverage entities of the refinement file.

5. A system for reuse of a refinement file in coverage grading, the system comprising:
   a memory and
   a processor configured to:
      obtain a first coverage model for testing of a first design, the first coverage model including a plurality of coverage entities, a calculation of coverage grading of testing of the first design using the first coverage model including a percentage of the plurality of coverage entities that are covered during the testing;
      obtain a refinement file that includes a listing of one or a plurality of the coverage entities to be excluded when calculating the coverage grading of the first coverage model;
      obtain mapping information to map a source path of each of one or a plurality of modules or instances of a module of the first coverage model, said each of one or a plurality of modules or instances of a module including one or more of said one or a plurality of coverage entities, to a target path of said each of one or a plurality of modules or instances of a module in a second coverage model for testing a new design that includes said one or a plurality of modules or instances of a module, wherein obtaining the mapping information comprises obtaining a selection of an instance of a module of said one or a plurality of modules or instances of a module, and wherein the processor is further configured to automatically identify all instances of the module in the second coverage model;

using a processor, based on the mapping information, translate a source path name of each of said one or a plurality of the coverage entities listed in the refinement file to a target path name of a coverage entity of said one or a plurality of the coverage entities in a new refinement file for the second coverage model, so as to exclude said one or a plurality of the coverage entities from a calculation of coverage grading during testing of the new design using the second coverage model; and use the new refinement file during testing of the new design using the second coverage model.

6. The system of claim 5, wherein the processor is further configured to obtain new mapping information to map the target path of said each of one or a plurality of modules or instances of a module in the second coverage model to a new target path of said each of one or a plurality of modules or instances of a module in a third coverage model; and using a processor, based on the refinement file, the mapping information, and the new mapping information, translate the source path name of each of said one or a plurality of the coverage entities listed in the refinement file to a new target path name of a coverage entity of said one or a plurality of the coverage entities in the third coverage model, so as to exclude said one or a plurality of the coverage entities from a calculation of coverage grading of the third coverage model.

7. The system of claim 5, wherein the refinement file includes a condition associated with a coverage entity of said one or a plurality of the coverage entities of the refinement file, and wherein the processor is further configured to exclude that coverage entity from the calculation only if the condition associated with that coverage entity is met.

8. The system of claim 5, wherein the processor is further configured to receive one or more conditions and to associate said one or more conditions with one or more coverage entities of said one or a plurality of the coverage entities of the refinement file.

9. A non-transitory computer readable storage medium for reuse of a refinement file in coverage grading, having stored thereon instructions that when executed by a processor will cause the processor to:

obtain a first coverage model for testing of a first design, the first coverage model including a plurality of coverage entities, a calculation of coverage grading of testing of the first design using the first coverage model including a percentage of the plurality of coverage entities that are covered during the execution obtain a refinement file that includes a listing of one or a plurality of the coverage entities to be excluded when calculating the coverage grading of the first coverage model;

obtain mapping information to map a source path of each of one or a plurality of modules or instances of a module of the first coverage model, said each of one or a plurality of modules or instances of a module including one or more of said one or a plurality of coverage entities, to a target path of said each of one or a plurality of modules or instances of a module in a second coverage model for testing a design that includes said one or a plurality of modules or instances of a module, wherein obtaining the mapping information comprises obtaining a selection of an instance of a module of said one or a plurality of modules or instances of a module, and wherein the instructions will cause the processor to automatically identify all instances of the module in the second coverage model;

based on the mapping information, translate a source path name of each of said one or a plurality of the coverage entities listed in the refinement file to a target path name of a coverage entity of said one or a plurality of the coverage entities in a new refinement file for the second coverage model, so as to exclude said one or a plurality of the coverage entities from a calculation of coverage grading during testing of the new design using the second coverage model; and use the new refinement file during testing of the new design using the second coverage model.

10. The non-transitory computer readable storage medium of claim 9, wherein the instructions stored thereon, when executed by a processor will cause the processor to obtain new mapping information to map the target path of said each of one or a plurality of modules or instances of a module in the second coverage model to a new target path of said each of one or a plurality of modules or instances of a module in a third coverage model; and using a processor, based on the refinement file, the mapping information, and the new mapping information, translate the source path name of each of said one or a plurality of the coverage entities listed in the refinement file to a new target path name of a coverage entity of said one or a plurality of the coverage entities in the third coverage model, so as to exclude said one or a plurality of the coverage entities from a calculation of coverage grading of the third coverage model.

11. The non-transitory computer readable storage medium of claim 9, wherein the refinement file includes a condition associated with a coverage entity of said one or a plurality of the coverage entities of the refinement file and wherein the instructions stored thereon, when executed by a processor will cause the processor to exclude that coverage entity from the calculation only if the condition associated with that coverage entity is met.

12. The non-transitory computer readable storage medium of claim 9, wherein the instructions stored thereon, when executed by a processor will cause the processor to receive one or more conditions and to associate said one or more conditions with one or more coverage entities of said one or a plurality of the coverage entities of the refinement file.

* * * * *